United States Patent Office 3,315,367
Patented Apr. 25, 1967

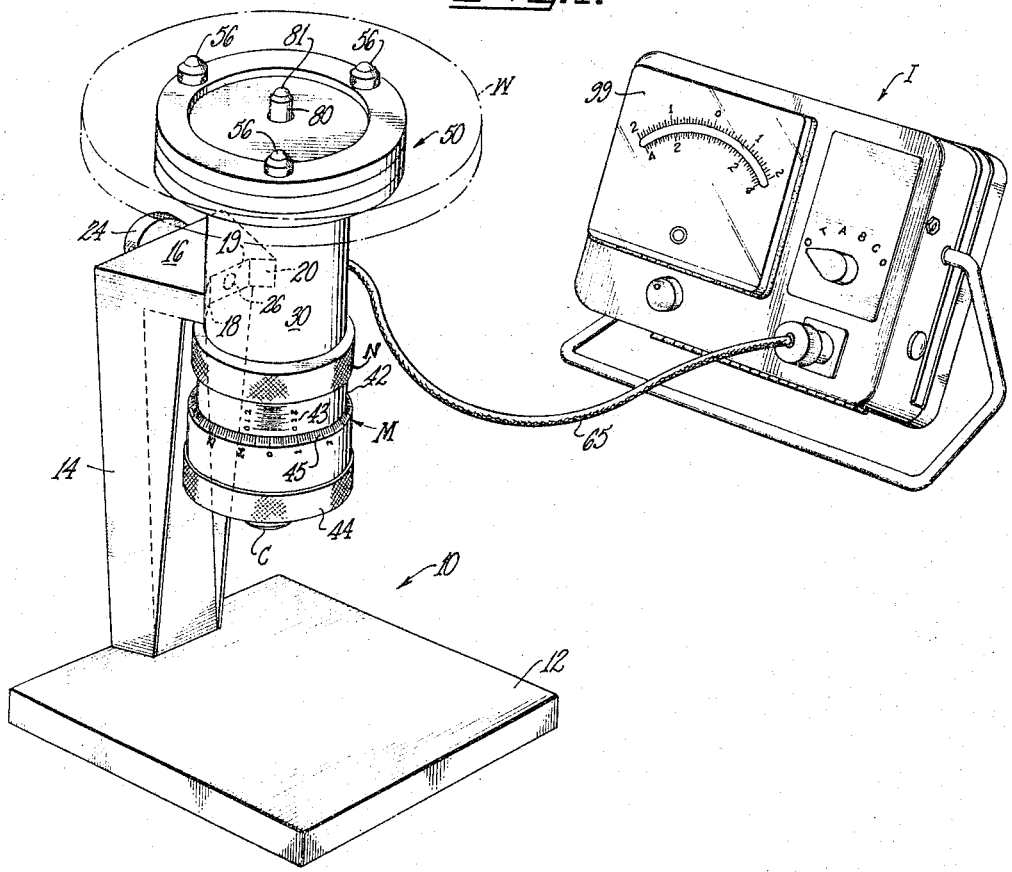
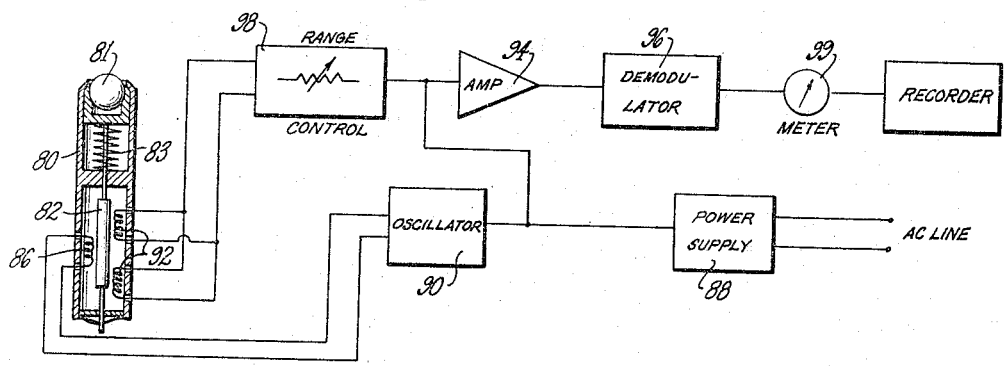

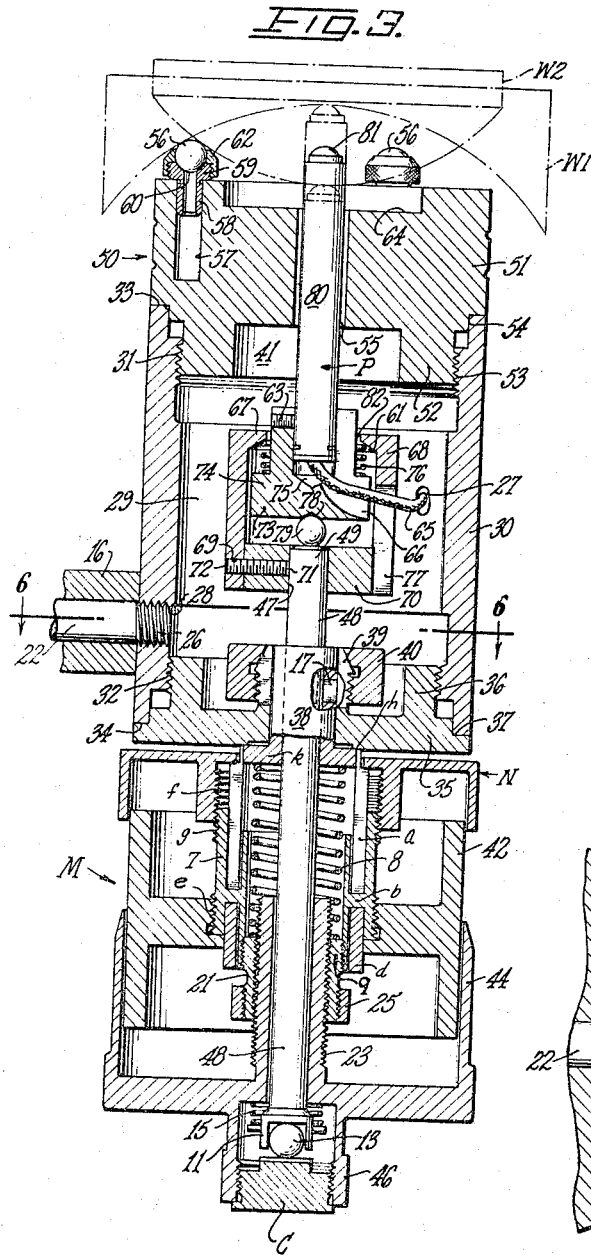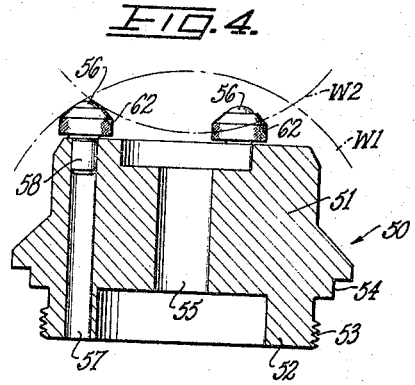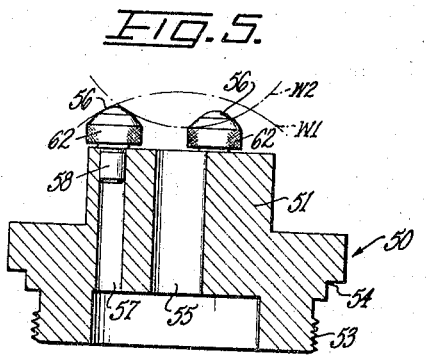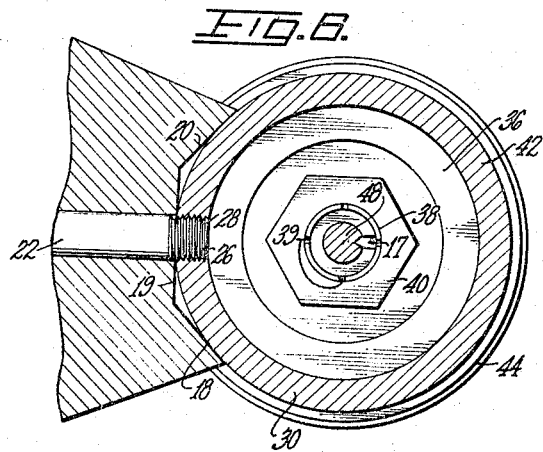

3,315,367
ELECTRONIC SPHEROMETERS
Thomas A. Walsh, Paramount, Calif., and Ray H. Strasbaugh, Downey, Calif. (3400 Airport Way, Long Beach, Calif. 90806); said Walsh assignor to said Strasbaugh
Filed Nov. 27, 1964, Ser. No. 414,381
10 Claims. (Cl. 33—178)

This invention relates to an electronic spherometer, which particularly is characterized by the utilization of a graduated series of terminally-mountable, interchangeable rings of different diameters and each bearing three contact-points. The trio of work-engaging contact-points are thus disposed by the mounted ring in a transverse plane perpendicular to the longitudinal axis of the spherometer. In conjunction with a longitudinally movable probe carried by the spherometer and centered relative to the trio of contact-points, the planar or spherical configuration of a thus-contained workpiece can be readily determined with extreme precision; and variations of such four-points, contacted continuous surface from its intended uniformity are also identified and measured.

Longitudinal displacement of the probe is micronically calibrated. The zero position of the probe as a unit can be varied by locating the unit so that the contact-tip will be on either side of the plane of the trio of contact-points (as well as coplanar therewith) so that either connex or concave work surfaces (as well as a normal workpiece) can be gaged. In addition, the contact-tip of the displaceable probe is resiliently retractable, and the electronically activated read-out instrument connected therewith can be balanced to zero at any selected position of partial retraction, so that the elevation or depression of an engaged surface from a curved or planar standard may be determined. The same facility can be used to make sure that the contact tip touches one work surface with the same amount of pressure as it subsequently touches another worksurface, so that the surface configuration of the two can be exactly compared; thus the possibility is avoided that two worksurfaces of identical curvature are "measured" differently due to the fact that the probe was pressed tighter against one than against the other.

Depending chiefly upon the size or immovable nature of the particular workpiece, our spherometer can be (usually manually) moved over its surface; or alternately the spherometer itself can be stationarily mounted and a small workpiece slid arcuately (when curved) back and forth over its four contact points. As indicated, these four contact points (the trio carried by an interchangeable ring, plus the contact-tip of the central probe) can be set to a known or predetermined curvature, and the contacted workpiece then matched against that. Or they can be conformed to the curvature of an unknown workpiece, and the curvature of the latter then calculated from the resulting measurement. Or again, the four contact-points can be set to the known curvature (e.g. spherical) of a workpiece, and the spherometer then moved back and forth over the worksurface to locate (and measure) spots of variation from the exact or ideal curvature. Or with a workpiece of non-uniform (non-spherical) curvature which varies to a different extent along diverse radial lines, such pattern as set by a standard (or mold) can be correlated with that along similar radial lines of successive workpieces.

The objects of the invention include the achievement of the above and related results, and the provision of highly effective means which are particularly adapted for such purpose.

In the drawings, which illustrate by way of example a presently preferred embodiment of the invention:

FIGURE 1 is a perspective view looking down on our electronic spherometer shown detachably secured to a standard, and operatively connected to a read-out or metering instrument, with a workpiece (indicated in phantom lines) seen in test position atop the spherometer;

FIGURE 2 is a partial axial sectional view taken through the contact end of the probe, with the electrically connected elements indicated schematically;

FIGURE 3 is an axial sectional view of our handable spherometer by itself, with portions in elevation and broken away, and two alternate (convex and concave) workpieces disposed in test position at the top (indicated in phantom);

FIGURES 4 and 5 are axial sectional views taken through unmounted contact- or work-support rings of different sizes, that is, having their trio of contact balls jointly describing arcs of different (spherical) curvatures; and FIGURE 6 is a transverse sectional view taken through the mounted spherometer along the line 6—6 of FIGURE 3.

As seen from the drawings, the invention may be embodied in a comparatively small assembly which can be packed in a small case to be carried about, and can then be located atop a table or workbench for use. For illustration, workpieces (W) of correspondingly small size are also shown. However it should be realized that this is not intended as a limitation on the size of workpieces which can be tested with our spherometer, or even as an indication that the spherometer need be of small size altho it is usually an advantage to have it such. In addition, the size of the detachable rings (with their trio of contact-points) do not necessarily correspond to the size of the workpiece being measured. The workpiece may be a hemisphere of 20 foot diameter, and be contacted by a "three-point" ring of say 10 inch diameter since a contact ring of the same diameter would be impractical. However, as a general rule, an arc of lesser curvature (i.e. chord or arc of a large circle) is more accurately measured with a contact ring which spans as much of it as possible. And particularly with a small workpiece, a contact ring which nearly completely spans it is preferred; but with increasing size of workpieces this is not feasible.

As seen in FIGURE 1, our handable spherometer is detachably secured to a mounting assembly 10 consisting essentially of a flat base plate 12, adjacent one edge of which is disposed an upstanding support bracket 14. The top of the latter extends toward the axis of the plate as a generally horizontally projecting ledge 16 of which the unsupported margin is disposed overhanging an area of the base 12 and is characterized by a trio of successive, end-to-end angularly adjacent and generally vertically disposed abutment faces, 18, 19 and 20, arranged collectively like one jaw of a vise. The central face 19 is traversed generally horizontally by a tapped bore which houses a retaining screw 22. The end of the latter, along the rear of the bracket 14, is formed with a manually adjustable, edge-milled, enlarged head 24, and distally has its projectable inner end 26 disposable to enter and threadedly engage a tapped socket 28 in the side wall of a cylindrical mounting tube or main housing 30 of the spherometer, so as thus to detachably and firmly retain the sleeve in upright position and close frictional registration with all the three abutment faces 18, 19, 20 of the bracket 14. With the spherometer thus mounted, a (small) workpiece W can be placed manually atop of it for determining its curvature (FIG. 1). Or with a larger or immovable workpiece, the spherometer can be removed from the mount 10 by unscrewing the head 24, and the (usually inverted) spherometer then manually held against the workpiece.

The tubular housing 30 which serves also as a handhold for the spherometer when it is detached from the mounting assembly 10, functions essentially to couple together two dissimilar units, terminally projecting from opposite ends, and by the housing thus retained in longitudinal and functional alignment. These are a micrometer M at one end, and a contact probe P (electrically connected to a read-out or recording unit) at the other end. The complex operation of the spherometer is based, first, on the initial longitudinal adjustability of one element of each of these two end-assemblies (that is, initially to locate the probe at an identified micrometer position before use); and secondly on the ability then to correlate the plus or minus displacement of the work-contacting probe from its pre-set zero, or alternately to correlate its contact position with the setting and mathematical function of a selected member of an interchangeable series of contact rings of different diameters, as hereinafter described.

Each end of the cylindrical tubular housing 30 is internally threaded for a short axial span 31, 32, each threaded length spaced inwardly a short distance from a respective annular, terminal abutment 33, 34, which forms a shoulder of lesser wall thickness than that of the main body of the housing 30. To be attached to the forward end of the device, by way of the annular socket thus formed jointly by the abutment shoulder 33 and the adjacent threaded area 31, there is provided a diametrically graduated series of contact rings 50.

Each ring is formed with an annular neck 52 externally threaded at 53 to engage the housing threads 31. Radially outward, an undercut annular groove 54 is disposed so as to fit within the corresponding end and inner walls of the projecting abutment 33. The body 51 of the ring is axially apertured at 55 for free projection of the shaft of the probe P therethrough. At each of three points spaced equidistantly about a theoretically concentric circle which is spaced inward a small distance from the circumference of the ring 50, there is mounted a (spherical) work-contact ball 56, which trio of balls are intended jointly to contact a workpiece W in conjunction with the longitudinally adjustable contact-tip or "fourth ball" 81 of the probe P, which four points thereby jointly define the spherical curvature of the particular workpiece which is jointly engaged by them.

Each ball 56 is located in an axially directed bore 57 by means of a tubular plug 58, which is snugly fitted therein and formed with a flared, peripherally threaded head 59 which outwardly has a dished or concave seat 60 which is correspondingly curved to receive the ball. An axially apertured and internally threaded cap 62 is then screwed down and tightened upon the flared head 59 of the plug, fixedly overlying the ball 56, and thus retaining the same in a position partially projecting therethrough so as to form a point contact with the workpiece W. The outer end-face of the body 51 of the contact ring may also be formed with a central, coaxial depression or well 64 to accommodate testpieces of convex curvature, and the opposite or inner end may also be countersunk at 41. If the contact point of any ball 56 tends to become flattened with prolonged use, the ball may simply be rotated to a different position in its socket after transiently loosening the cap 62.

At the proximate end of the housing 30 is a tubular adapter collar 35 which is terminally similar to the opposing attachment means for each contact ring 50. An externally threaded neck 36 and annular step 37 engage the corresponding housing threads 32 and abutment shoulder 34. The forward end of an axial tube 38 fixedly projects into the housing chamber 29 from the distal end of the micrometer M and there traverses an externally threaded, split boss 39 which is integral with the collar 35. A tapered-aperture hex nut 40 is disposed to clamp together the terminally tapered and axially split segments of the boss 39, thus fastening the tube 38 and the attached micrometer to the adapter collar 35 and housing 30.

Essentially a micrometer embodies a rotatable member or thimble 44 which threadedly engages a calibrated barrel 42 whereby one is moved axially to the other by a precisely measurable distance. In the present construction, the thimble is also distally secured to the probe assembly and thus mechanically measures the longitudinal displacement of the latter from a set position (whereas the displacement of the probe-tip is electronically measured). Location at the initially set position is effected by manipulation of a positioning nut N which serves to slide axially (relative to the housing 30), the sub-assembly consisting of the micrometer M and connected probe P.

A spindle 48 axially traverses the composite body of the micrometer and extends forward into the housing chamber 29 where its distal end 49 is anchored in the aperture 47. In traversing the tube 38, the spindle 48 is slidingly engaged by a radially directed wedge 17 (FIG. 6) which is fixedly held by the boss 39 and thus rides in a longitudinal groove of the spindle and accordingly restrains the spindle against rotation; that is, in operation (upon turning the thimble) the spindle 48 moves lengthwise without turning. The proximate end of the spindle is held constant against the end face of the rotatable thimble 44 by means of a coil spring 15 bearing against a socket end 11 of the spindle within a terminal housing knob 46, thereby maintaining a ball bearing 13 in registration with the inner face of a closure plug C.

The tube 38 is formed with a proximately flanged, transverse end k which stationarily abuts the end face of adapter collar 35 and is partially received within the aperture h of the nut N. Proximately thereto, the spindle 48 is surrounded by a coil spring 8, which in turn is surrounded by a tubular casting 7 having the form of an H-shaped or dual cylinder, externally threaded at g and e. The forward threads g rotationally engage the internal threads of the nut N; the rear threads e stationarily attach the casting 7 to the micrometer barrel 42. An intermediate tube d havig longitudinal slots a extending back partway from its forward end so as to have the cross arms b of the H-shaped casting 7 inserted therein, is splined to the casting 7 when thus assembled. An intermediate nut 21, both internally and externally threaded, is mounted on the tubular stem 23 of the thimble 44, with its forward portion 9 threadedly engaging the casting 7 and forwardly providing a seat for the spring 8. An additional nut 25 serves to stabilize the assembly against backlash.

Centrally spaced within the housing chamber 29 which is formed or enclosed by the housing tube 30, is a tubular cage 68 which serves to functionally couple together within itself the inwardly adjacent or housed ends of the micrometer spindle 48 and the forwardly-extending probe P. The cage 68 is initially formed open at both ends, with the proximate or micrometer end then closed by a washer-shaped plug 70 having a radial aperture 71. A screw 72 inserted successively through the bore 69 of the cage and then through the aligned aperture 71 of the plug, bears inwardly against the spindle 48 to anchor the latter within the longitudinal bore 47. The spindle is thus located coaxial with the plug 70, with the cage 68, and with the outer housing 30. Thus, turning the micrometer thimble 44 by the knob 46, moves the spindle 48 jointly with the cage 68 and probe P, lengthwise so as to project or retract the contact-tip 81 in relation to a mounted contact ring 50 and to a worksurface engaged by its trio of contact balls 56.

Within the cage 68, an inverted-T-shaped adapter 74 is resiliently held by a compression spring 76 which bears against an inner, conically tapered face 61 of the cage end 67, and proximately against the face of the flared head 73. The end of the probe shaft 80 is anchored by the screw 63 within an outward-opening socket of the adapter 74, and an electric conduit 65 through openings 66, 67, 27 connects it to the instrument I. The proximate face of the head 73 is formed with a depression or axial socket 78 which seats a ball bearing 79, thus held against the end 49 of the spindle. It will be seen that the slanted surface 61 and spring 76 make the adapter 74 self-centering when laterally tilted by jarring of the contact-tip 81.

The tubular body 80 of the probe is longitudinally adjustable within the aperture 55 by means of the micrometer thimble 44. Within the tube 80, the projecting contact tip 81 which is held normally extended by the spring 83, is pressed in against the spring tension by frictional contact of a (fixed or moving) workpiece W thereagainst. Inwardly, the tip 81 is fixed to a metallic core 82 which (longitudinally reciprocable) core is centered within a differential transformer. The latter, fixedly mounted within the tube 80, consists of a primary coil 86 (supplied with alternating current thru the power supply 88 and oscillator 90), and a secondary coil 92 which consists of a pair of opposing windings in which an induced voltage is normally cancelled. However, longitudinal displacement of the core 82 (by movement of the tip 81) allows an unbalancing voltage to be induced in one half or the other of the secondary winding 92. This is proportional to the linear displacement of the tip 81. As represented schematically in FIGURE 2, such induced current, passed thru an amplifier 94 and demodulator 96 (comprising a bridge for obtaining balance to provide a zero setting corresponding to an initial or set position of the probe tip 81), by direct current then yields a visual (or other) signal on the metering device I. By means of the range control 98, comprising resistances of different values which may be selectively placed in the circuit, different indicator scales 99 can be used for the readout or recording. Such transistorized sensing instruments ("electroprobe") and associated indicating or recording device are available articles of commerce per se, and further description thereof is believed unnecessary U.S. Patents 2,240,278, 2,305,264, 2,408,524, 2,620,655, 2,885,660.

In use, for example, the meter scale 99 may be set to zero when the (partially retracted) tip 81 is thus frictionally engaged by a designated plane or arc of curvature of a workpiece W. As the latter is then moved latterally in relation to the probe P (or vice versa), variations encountered by the tip 81 from its initial position will be registered as plus or minus the corresponding amount on the scale 99.

In using our instrument, for example, to determine the unknown curvature of a spherical workpiece:

(1) The spherometer, with the largest available contact ring 50 which does not quite span the workpiece, is first placed on a level surface to check that its micrometer scale thus registers zero (with all four balls making contact with the surface), and any necessary adjustment is then made by the nut N.

(2) Four point contact is then made with the curved workpiece by placing the two together and longitudinally moving the probe in or out as may be required, by turning the knob 46.

(3) The new reading is taken on the micrometer— that is, the plus or minus difference from the planar zero. Such measured chordal depth is sometimes referred to as "sagitta." In a Table of Constants, under the "radius of circle" for the specific contact ring used, will be found the unknown radius of curvature (of the workpiece) which corresponds to the "sagitta" value read on the micrometer.

The opposite procedure can likewise be followed; that is, the spherometer is set to correspond to a known (desired) radius of curvature, and the instrument is then rested upon or slid over a workpiece. Whether (and how much) the instrument I then indicates an axial displacement of the contact-tip 81 is then noted. The amount of such variation can be read from a calibrated instrument I, or alternately by moving the micrometer to another position of contact where its difference from the previous setting is obtained.

It will be clear to those skilled in the art that various changes of construction and operation may be made within the present inventive concept, having in mind the substitution of functional equivalents within the ability of one skilled in the art, and therefor this disclosure is not to be limited by the precise details shown in the drawings and particularly described in the specification by way of example, but it is our intention to hereafter claim the invention broadly, aside from the limitations inherent in the piror art.

We claim:

1. A device of the character described, adapted for measuring curvature or surface irregularities of a workpiece contacted thereby, the device comprising in combination:

a longitudinal housing;

work-contact means disposed adjacent one end of said housing and characterized by three contact elements, mutually spaced from each other equidistant in an annular plane which is generally perpendicular to said housing;

a longitudinally adjustable probe, reciprocably carried by said housing and having a contact tip projecting therefrom perpendicular to said annular plane and selectively displaceable on either side of the plane of the three contact elements, the contact tip in such alternate positions thus being adapted to abut the continuous surface of a correspondingly shaped workpiece when the latter is located jointly against the contact tip and against the three contact elements;

calibrated positioning means operatively coupled to the probe for longitudinally adjusting the same relative to the plane of the contact elements, whereby the probe may be located to define a designated convex or concave curvature of said continuous surface in conjunction with said trio of contact elements; and electrically-activated indicator means adapted to register longitudinal displacement of the reciprocable contact tip in either direction from a predetermined and variably set reference position relative to the curvature of said continuous surface.

2. The device of the preceding claim 1 wherein said work contact means having three contact elements comprises a series of interchangeable contact supports of different diameters, each with an open center generally axial to said three contact elements, and means for selective attachments of each contact support to said one end of said housing.

3. The device of the preceding claim 1 which additionally contains self-centering means associated with said housing and supporting said probe, thereby to yieldingly position the contact tip axially to the surrounding circle of three contact elements, and to allow it to yield laterally when abutted by an upstanding surface irregularity in moving across a contacted workpiece.

4. The device of the preceding claim 1 wherein said indicator means include within said probe a differential transformer having a primary coil and a secondary coil, which latter consists of a pair of opposing windings in which an induced voltage from the primary coil is normally cancelled, and the contact tip of said probe is fixed to a metallic core disposed within said probe, which core is lengthwise reciprocably mounted between said transformer coils and is thus movable in unison with said contact tip, thereby to unbalance the induced voltage in the windings of the secondary coil and thus to register the linear displacement of the contact tip.

5. A device of the character described, adapted for measuring curvature or surface irregularities of a workpiece contacted thereby, the device comprising in combination:

a tubular housing formed with a longitudinal bore having attachment means adjacent at least one end thereof;

a series of contact supports of different diameters each with an open center and means for selective attachment to an end of said housing with the open center generally aligned with the housing bore, the distal face of each support bearing three contact elements, each projecting outward therefrom and mutually spaced from each other equidistant in an annular plane which is perpendicular to and coaxial with said housing bore;

a longitudinally adjustable probe, axially mounted within said housing bore with a spring-loaded contact tip projecting therefrom axially to and selectively displaceable on either side of the plane of the three contact elements, the contact tip in such alternate positions thus being adapted to abut the surface of a correspondingly shaped workpiece when the latter is located jointly against the contact tip and against the three contact elements of any one of said series of supports which is mounted on the housing;

self-centering means associated with said housing and supporting said probe, thereby to yieldingly position the contact tip axially to the surrounding circle of three contact elements, and to allow it to yield laterally when abutted by an upstanding surface irregularity in moving across a contacted workpiece; and calibrated positioning means operatively coupled to the probe for longitudinally adjusting the same relative to the plane of the contact elements, whereby the probe may be located to define a designated convex or concave curvature in conjunction with a particular trio of contact elements borne by a respective demountable contact support.

6. A device of the character described, adapted for measuring curvature or surface irregularities of a workpiece contacted thereby, the device comprising in combination:

a housing formed with a longitudinal bore;

work-contact means disposed adjacent one end of said housing bore and characterized by three contact elements mutually spaced from each other equidistant in an annular plane which is perpendicular to said bore;

a micrometer comprising a tubular cylinder and a micrometer thimble rotatably secured thereto in axial alignment with said housing bore;

a probe carried by said housing longitudinally reciprocable along said bore and coaxial with said work-contact means, said probe being coupled to said micrometer thimble for axial displacement upon rotation of said thimble, said probe having a longitudinally calibrated, retractable contact tip at the distal end thereof;

self-centering means associated with said housing and supporting said probe, thereby to yieldingly position the contact tip axially to the surrounding circle of three contact elements, and to allow it to yield laterally when abutted by an upstanding surface irregularity in moving across a contacted workpiece;

operative means for jointly longitudinally displacing said micrometer and probe relative to said work-contact means; and indicator means responsive to pressure of a workpiece thereagainst for measuring the linear movement of said tip of the probe, from a position set by said operative means.

7. The device of the preceding claim 5 wherein said indicator means include a read-out scale and balancing means for setting said scale to a zero position when said contact tip is partially retracted, thereby enabling measurement of both elevation and depression of the contacted surface of a workpiece from said predetermined zero position.

8. A device of the character described, adapted for measuring curvature or surface irregularities of a workpiece contacted thereby, the device comprising in combination:

an open-ended tubular housing formed with a longitudinal bore and coupling means adjacent at least one end thereof;

a series of contact supports of different diameters, selectively attachable to said coupling means and individually formed with an axial aperture and with a distal face bearing three contact elements, each contact element projecting outward therefrom and mutually spaced from each other equidistant in an annular plane which is perpendicular to said housing bore and axial aperture;

a micrometer mounted at the other end of said housing for limited longitudinal displacement relative thereto and comprising a tubular cylinder and a micrometer thimble rotatably secured thereto;

a longitudinal spindle with its proximate end resiliently and axially secured within said thimble for rotation jointly therewith and extending centrally through the tubular cylinder with its distal end projecting into said housing;

a tubular cage floatingly disposed within said housing with the distal end of said spindle fixedly secured thereto for joint rotation therewith, said cage together with the spindle also being longitudinally displaceable within the housing by reciprocal movement of said micrometer;

operative means for jointly longitudinally displacing said micrometer and spindle relative to said housing which means include a coaxially mounted positioning nut connecting said housing and micrometer;

a self-righting, axially located adapted retained within said cage distal to the fixed end of said spindle, a ball bearing held between and in socketed contact with said adapter and the fixed end of said spindle, and resilient stabilizing means adapted to maintain said socketed contact and upon transient tilting of the adapter to restore the latter to a normal, axially aligned position;

a probe having a proximate end fixedly secured axially to said adapter and comprising a tubular body displaceably extending outward from said housing and through the axial aperture of one of said mounted contact supports, and a longitudinally retractable contact tip resiliently mounted at the distal end of the tube; and indicator means responsive to pressure of a workpiece thereagainst for measuring the linear movement of the tip within the tubular body.

9. The device of the preceding claim 7 wherein said indicator means include within said probe a differential transformer having a primary coil and a secondary coil, which latter consists of a pair of opposing windings in which an induced voltage from the primary coil is normally cancelled, and the contact tip of said probe is fixed to a metallic core disposed within said probe, which core is lengthwise reciprocably mounted between said transformer coils and is thus movable in unison with said contact tip, thereby to unbalance the induced voltage in the windings of the secondary coil and thus to register the linear displacement of the contact tip.

10. The device of the preceding claim 8 wherein said indicator means include a read-out scale and bridge means for electrically balancing said scale to a zero position when said contact tip is partially retracted, thereby enabling measurement of both elevation and depression of the contacted surface of a workpiece from said predetermined zero position.

References Cited by the Examiner

UNITED STATES PATENTS

| 1,093,307 | 4/1914 | Becker | 33—170 |
| 2,583,791 | 1/1952 | Neff | 33—172 |
| 2,664,640 | 1/1954 | Euverard | 33—170 X |
| 3,197,879 | 8/1965 | Chapman | 33—174 |

LEONARD FORMAN, *Primary Examiner.*

S. S. MATTHEWS, *Assistant Examiner.*